US005955964A

United States Patent [19]

Tada

[11] Patent Number: 5,955,964

[45] Date of Patent: Sep. 21, 1999

[54] SELECTIVE-CALLING RADIO RECEIVER CAPABLE OF VIBRATION WARNING

[75] Inventor: Ken-ichi Tada, Shizuoka, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,484

[22] Filed: Jul. 12, 1996

[30] Foreign Application Priority Data

Jul. 13, 1995 [JP] Japan .................................... 7-177022

[51] Int. Cl.[6] ................................ G08B 5/22; H04B 7/00

[52] U.S. Cl. ................................ 340/825.46; 340/825.44; 455/38.3

[58] Field of Search ................................ 455/38.3, 38.2, 455/38.1, 343; 340/825.46, 825.44, 407.1, 407.2, 825.48, 825.73; 345/82, 211; 330/258

[56] References Cited

U.S. PATENT DOCUMENTS 3,746,005 7/1973 Thaler et al. ........................... 128/419

FOREIGN PATENT DOCUMENTS 2-197273 8/1990 Japan .
3-249012 11/1991 Japan .
4-222477 8/1992 Japan .
4-281630 10/1992 Japan .
5-161369 6/1993 Japan .
5-191334 7/1993 Japan .
5-344761 12/1993 Japan .
2277622 11/1994 United Kingdom .

*Primary Examiner*—Michael Horabik
*Assistant Examiner*—Jean B. Jeanglaude
*Attorney, Agent, or Firm*—Sughrue, Mion, Zinn, Macpeak & Seas, PLLC

[57] ABSTRACT

A radio selective calling receiver that enables to restrain the vibration strength change of a warning vibrator independent of the supply voltage change of a dc power supply. This receiver contains a warning controller for controlling a specified warning operation including a warning vibration to give a warning to a user on receipt of a calling signal, a vibrator for producing the warning vibration by an electric power supplied from a dc power supply, and a switching transistor for switching the electric power supplied to the vibrator to thereby produce the warning vibration intermittently. The transistor has a first state in which the electric power is supplied to the vibrator and a second state in which the electric power is not supplied to the vibrator. The both states are alternately effected by a control signal generated by the warning controller. The receiver further includes a power compensator for compensating change of the electric power supplied to the vibrator to thereby restrain change of a vibration strength of the warning vibration. The compensator adjusts the control signal so that a duration of the first state of the transistor is increased according to the decrease of the electric power supplied to the vibrator.

2 Claims, 4 Drawing Sheets

SELECTIVE-CALLING RADIO RECEIVER CAPABLE OF VIBRATION WARNING

BACKGROUND OF THE INVENTION

1. Field of the Invention

The present invention relates to a selective-calling radio receiver such as a pager and more particularly, to a selective-calling radio receiver equipped with a vibrator for vibration warning to a user.

2. Description of the Prior Art

Conventional selective-calling radio receivers of this sort were disclosed in the Japanese Non-Examined Patent Publication Nos. 4-281630 published in October 1992 and 5-191334 published in July 1993. In these conventional receivers, a dc power generated by a dc power supply (for example, a dry battery) is intermittently supplied to a vibrator under the operation of a switching transistor, thereby generating an intermittent vibration of the vibrator. The supplied power to the vibrator has a substantially square waveform and is caused by the switching operation of the transistor. The vibrator has a pulse motor and a vibration plate eccentrically fixed to the rotating shaft of the motor.

With the conventional selective-calling radio receivers described above, since a comparatively large current is necessary for the dc power supply to drive the vibrator, a dry battery, which can provide a large supply current, is often used as the power supply. However, the electromotive force of the dry battery tends to decrease with the discharge time and as a result, the following problem will occur:

Specifically, because of the electromotive force decrease of the dry battery, the driving power for the warning vibrator tends to decrease and accordingly, the vibration strength of the vibrator also decreases with the discharge time of the dry battery. For example, when the amplitude of the square-wave driving voltage supplied from the dry battery decreases from 1.5 V to 1.1 V due to the driving power lowering of the dry battery, the vibration strength of the vibrator may tend to decrease by 46% of the normal vibration strength. Such the decrease of the vibration strength will increase the danger that the receiver user does not notice the vibration warning.

SUMMARY OF THE INVENTION

Accordingly, an object of the present invention is to provide a selective-calling radio receiver that enables restraint of the vibration strength change of a warning vibrator independent of the supply voltage change of a dc power supply.

Another object of the present invention is to provide a selective-calling radio receiver in which a user surely notices the vibration warning even if a supply voltage of a dc power supply for the receiver is reduced.

A selective-calling radio receiver according to the present invention includes a warning controller for controlling a specified warning operation including a warning vibration to give a warning to a user on receipt of a calling signal, a vibrator for producing the warning vibration by an electric power supplied from a dc power supply, and a switching transistor for switching the electric power supplied to the vibrator to thereby produce the warning vibration of the vibrator intermittently.

The switching transistor has a first state in which the electric power is supplied to the vibrator and a second state in which the electric power is not supplied to the vibrator. The first and second states are alternately effected by a control signal generated by the warning controller.

The receiver further includes a power compensator for compensating change of the electric power supplied to the vibrator to thereby restrain change of a vibration strength of the warning vibration. The power compensator adjusts the control signal so that a duration of the first state of the switching transistor is increased according to the decrease of the electric power supplied to the vibrator.

With the selective-calling radio receiver according to the present invention, there is the power compensator for compensating change of the electric power supplied to the vibrator to thereby restrain change of the vibration strength of the warning vibration, and the power compensator serves to increase the duration of the first state of the switching transistor in which the electric power is supplied to the vibrator according to the decrease of the electric power supplied to the vibrator.

Consequently, the change of the vibration strength of the warning vibration can be restrained independent of the supply voltage change of the dc power supply. This means that the user of the receiver surely notices the vibration warning even if the supply voltage of the dc power supply is reduced.

In a preferred embodiment, the power compensator includes a square-wave signal generator for generating a square-wave voltage signal having a substantially square waveform, a differentiating circuit for differentiating the square-wave voltage signal to thereby generate a differential voltage signal, and a comparator for comparing levels of the differential voltage signal and the supply voltage of the dc power supply to thereby adjust the control signal so that the duration of the first state of the switching transistor is increased according to the decrease of the electric power supplied to the vibrator.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Figure 1:
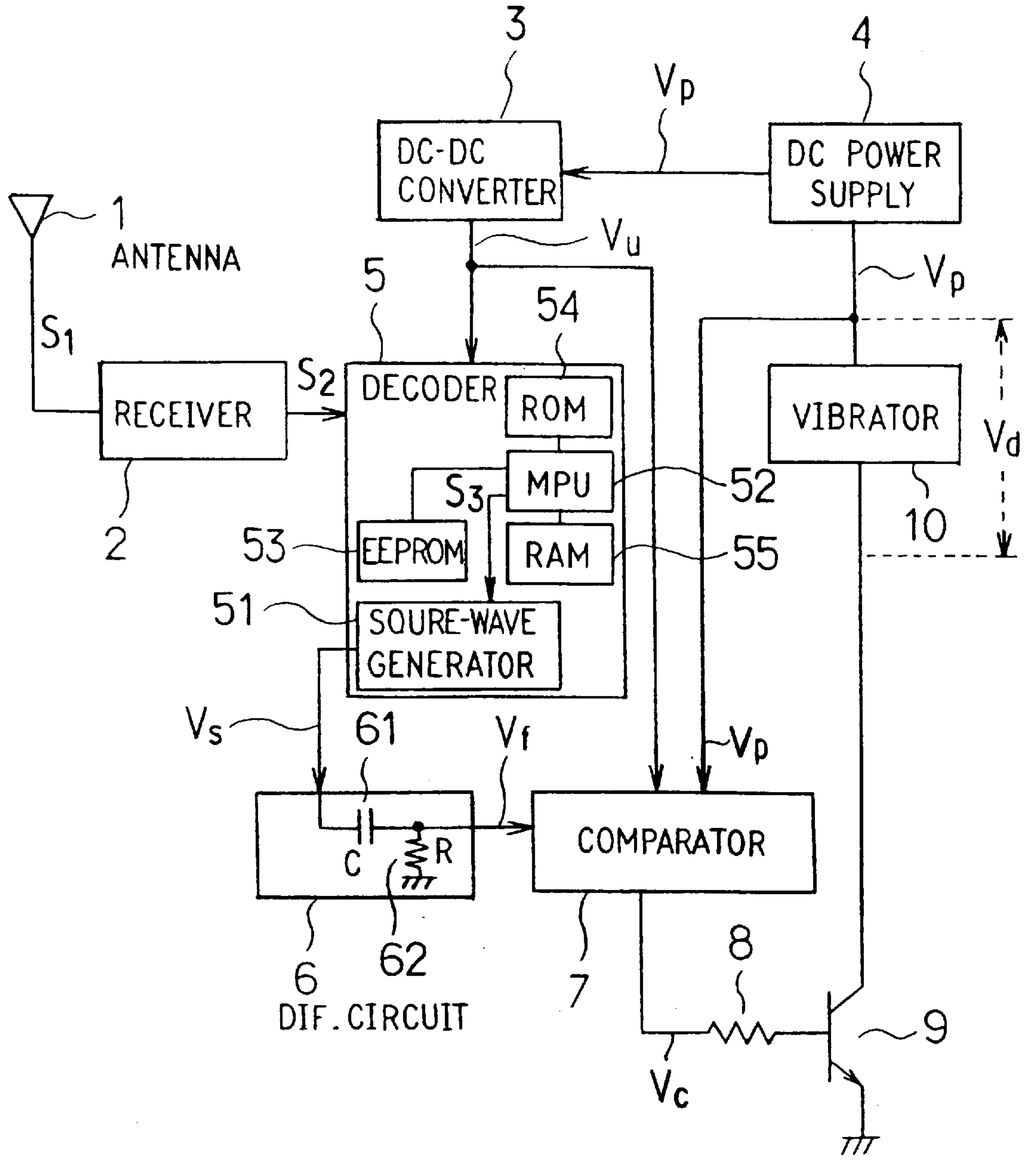
FIG. 1 is a functional block diagram of a selective-calling radio receiver according to an embodiment of the present invention.

A preferred embodiment of the present invention will be described below while referring to the drawings attached.

A selective-calling radio receiver according to an embodiment of the present invention has a configuration as shown in FIG. 1.

In FIG. 1, this radio receiver has an antenna 1, a radio receiver circuit 2, a dc—dc converter 3 serving as a voltage booster, an exchangeable dc power supply 4, a decoder 5, a differential circuit 6, a comparator 7, a protection resistor 8, a switching transistor 9, and a warning vibrator 10.

The receiver circuit 2 receives a coded calling signal $S_1$ transmitted from a base station or stations of a paging system through the antenna 1. The receiver circuit 2 demodulates the coded calling signal $S_1$ to produce a digital signal $S_2$ which can be read by the decoder 5. The digital signal $S_2$ is then inputted into the decoder 5.

The dc power supply 4, which includes a set of several dry batteries, supplies a supply voltage $V_p$ to the dc—dc converter 3. The converter 4 serves to produce a raised and stabilized voltage $V_u$, where $V_p < V_u$. For example, when $V_p$=1.5 V, $V_u$ is set as 2.2 V. The raised and stabilized voltage $V_u$ is supplied to the decoder 5 and the comparator 7 for driving or operating them.

The decoder 5 comprises a square-wave generator 51, a microprocessor unit (MPU) 52, an electrically-erasable, programmable read-only memory (EEPROM) 53, a read-only memory (ROM) 54, and a random-access memory (RAM) 55.

Figure 2A:
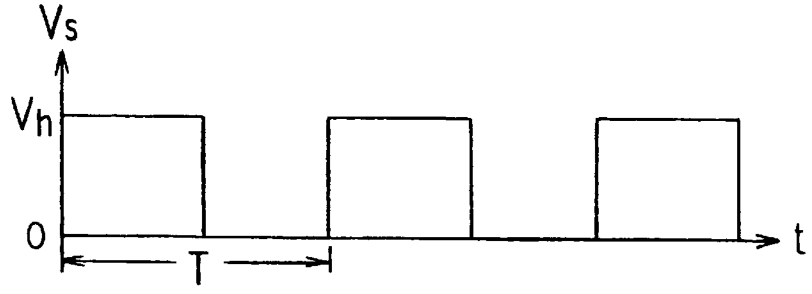
FIG. 2A is a time chart showing the square-wave signal voltage used in the selective-calling radio receiver according to the embodiment of FIG. 1.
Figure 3A:
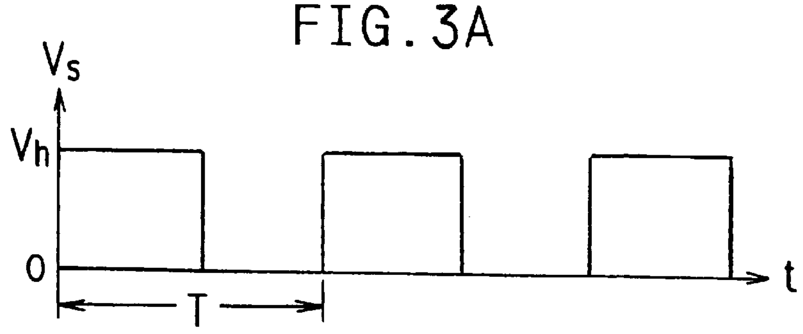
FIG. 3A is a time chart showing the square-wave signal voltage used in the selective-calling radio receiver according to the embodiment of FIG. 1.

The square-wave generator 51, which is composed of a digital circuit, generates a square-wave signal voltage $V_s$ as shown in FIGS. 2A and 3A and outputs the signal $V_s$ to the differential circuit 6. The square-wave signal voltage $V_s$ contains square pulses repeated at a constant period of T. Each of the repeated pulses has a constant amplitude of $V_h$.

The EEPROM 53 stores the data corresponding to the identification number (ID No.) of this selective-calling radio receiver. The ROM 54 stores a control program for processing the digital signal $S_2$ and for controlling the respective elements or components of this selective-calling radio receiver. The RAM 55 is used for temporarily storing the data to be processed in the decoder 5. The MPU 52 controls the entire operation of this radio receiver according to the control program stored in the ROM 54.

Further, the MPU 52 compares the coded ID No. contained in the digital signal $S_2$ with the coded ID No. of this radio receiver stored in the EEPROM 53. If the ID No. contained in the signal $S_2$ accords with that stored in the EEPROM 53, the MPU 52 sends an activation signal $S_3$ to the square-wave generator 51 in order to start a specified warning operation to the user. The warning operation usually contains not only a warning vibration caused by the vibrator 10 but also a warning sound generated from a speaker (not shown) and/or a flash of a calling lamp. If the ID does not match, no activation signal $S_3$ is supplied to the square-wave generator 51.

The square-wave signal voltage $V_s$, each pulse of which has the constant amplitude of $V_h$, is supplied to the differential circuit 6 in order to generate a differential signal voltage $V_f$. The amplitude value of $V_h$ is approximately equal to the value of the raised, stabilized voltage $V_u$.

Figure 2B:
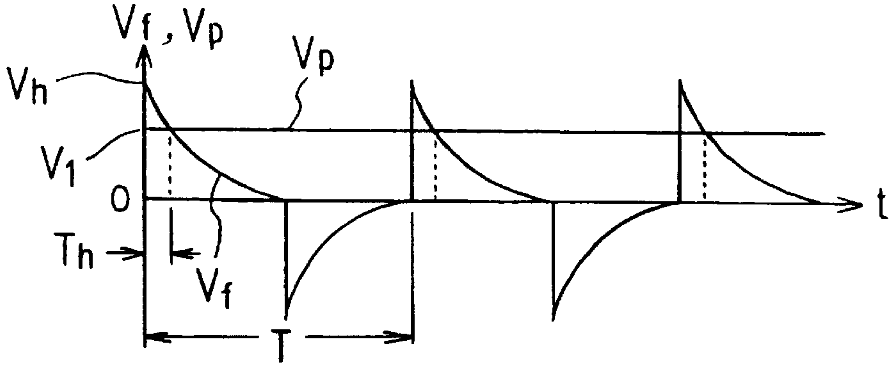
FIG. 2B is a time chart showing the relationship between the differential signal voltage and the supply voltage used in the selective-calling radio receiver according to the embodiment of FIG. 1, where the dc supply voltage is high.
Figure 3B:
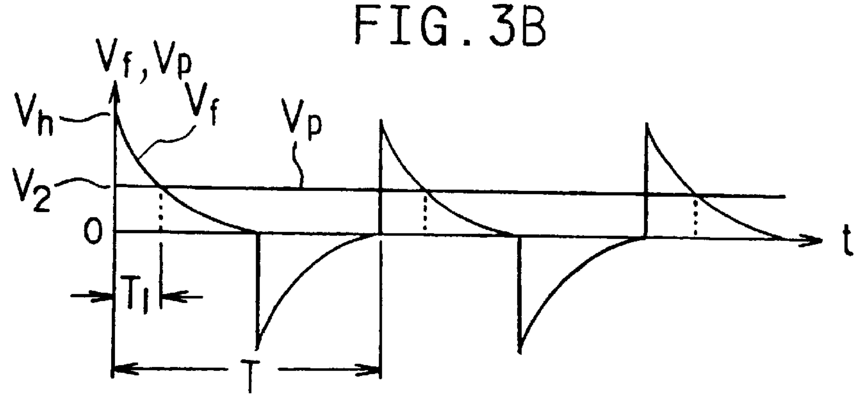
FIG. 3B is a time chart showing the relationship between the differential signal voltage and the supply voltage used in the selective-calling radio receiver according to the embodiment of FIG. 1, where the dc supply voltage is low.

The differential signal voltage $V_f$ has a waveform as shown in FIGS. 2B and 3B, which contains repeated pulses at the same period T as that of the square-wave signal voltage $V_s$. Each pulse of the signal voltage $V_f$ is approximately equal to $V_h$ at the rise and approximately equal to $-V_h$ at the fall thereof.

The duration where the level of the differential signal voltage $V_f$ is greater than that of the supply voltage $V_p$ varies with the value of the supply voltage $V_p$. Specifically, this duration is $T_h$ for $V_p=V_1$, and it is $T_1$ longer than $T_h$ for $V_p=V_2$, where $V_1$ is higher than $V_2$.

The differential circuit 6 has a capacitor 61 with a capacitance C and a resistor 62 with a resistance R. The capacitor 61 is connected between the input and output terminals or the circuit 6. One end of the resistor 62 is connected to the output-side end of the capacitor 61 and the input-side end thereof is grounded.

The differential circuit 6 receives the square-wave signal voltage $V_s$ from the square-wave generator 51 and produces the above differential voltage signal $V_f$ from the signal $V_s$. The differential voltage signal $V_f$ is inputted into the comparator 7.

The comparator 7 receives the differential signal voltage $V_f$ from the differential circuit 6 and the supply voltage $V_p$ from the power supply 4 through its input terminals. The comparator 7 compares the signal voltage $V_f$ with the supply voltage $V_p$ and outputs a control signal voltage $V_c$ to the switching transistor 9 through its output terminal.

The control signal voltage $V_c$ has repeated pulses at the same period T as that of the square-wave signal voltage $V_s$. When the level of the differential signal voltage $V_f$ is greater than that of the supply voltage $V_p$, the control signal voltage $V_c$ is in the high (H) level. When the level of the differential signal $V_f$ is equal to or less than that of the supply voltage $V_p$, the control signal voltage $V_c$ is in the low (L) level.

In this embodiment, the switching transistor 9 is an npn-type bipolar transistor having a base connected to the output terminal of the comparator 7 through the protection resistor 8. The resistor 8 has a function of restraining the base current of the transistor 9. A collector of the transistor 9 is connected to one end of the vibrator 10. The other end of the vibrator 10 is connected to the dc power supply 4. An emitter of the transistor 9 is grounded.

When the control signal voltage $V_c$ becomes in the H level, the switching transistor 9 turns on and then, a driving current $I_d$ start to flow through the transistor 9. The current $I_d$ continues to flow through the transistor 9 for the duration of the H level, as shown in FIGS. 2D and 3D. In this on-state, the vibrator 10 is applied with the driving voltage $V_d$ which is approximately equal to the supply voltage $V_p$, thereby producing a warning vibration.

The vibrator 10 includes a conductive coil whose internal resistance is r and therefore, the driving current $I_d$ is expressed as $I_d=V_p/r$.

When the control signal voltage $V_c$ becomes in the L level, the switching transistor 9 turns off and then, a driving current $I_d$ stops flowing through the transistor 9. In this off-state, the vibrator 10 is not applied with the driving voltage $V_d$ and as a result, no warning vibration is produced.

Figure 2C:
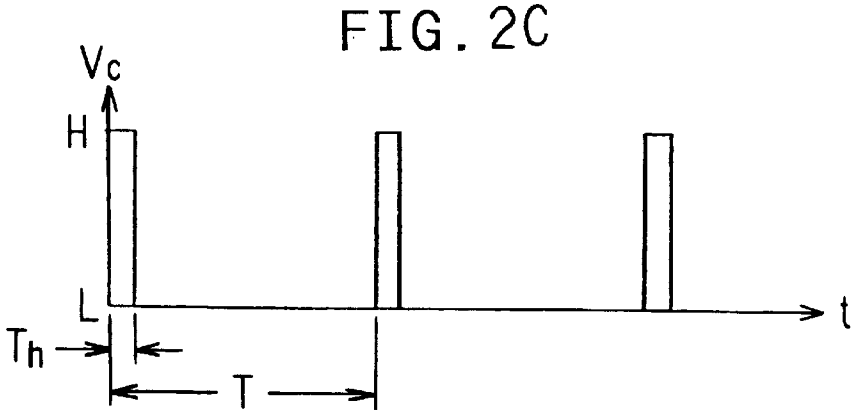
FIG. 2C is a time chart showing the pulsed control signal voltage used in the selective-calling radio receiver according to the embodiment of FIG. 1, where the dc supply voltage is high.
Figure 2D:
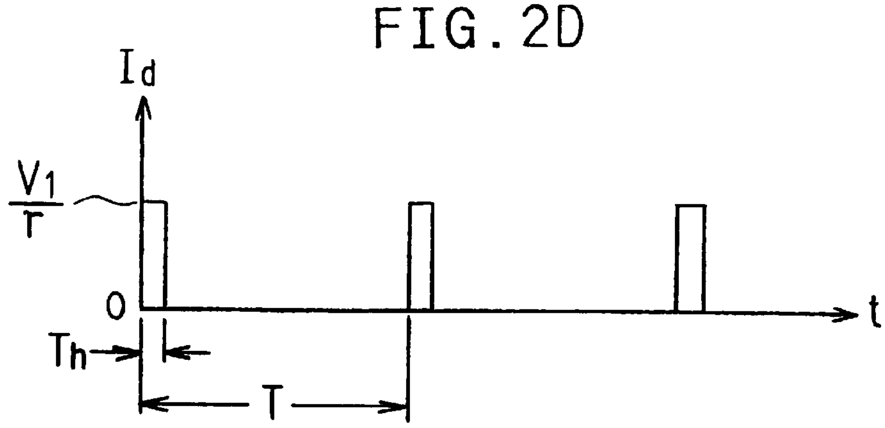
FIG. 2D is a time chart showing the driving current for the warning vibrator in the selective-calling radio receiver according to the embodiment of FIG. 1, where the dc supply voltage is high.
Figure 3C:
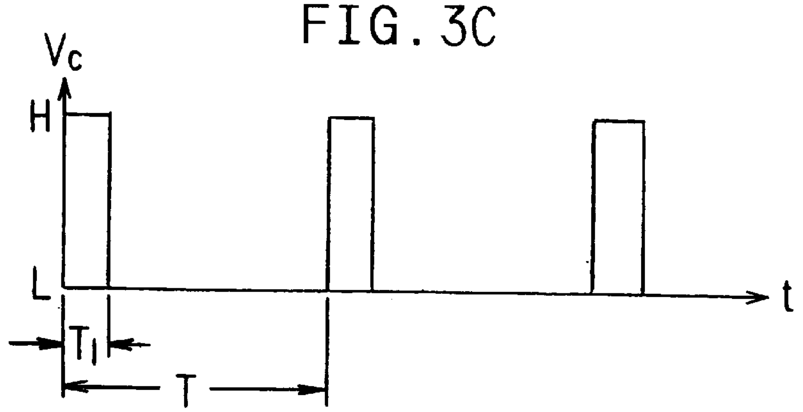
FIG. 3C is a time chart showing the pulsed control signal voltage used in the selective-calling radio receiver according to the embodiment of FIG. 1, where the dc supply voltage is low.
Figure 3D:
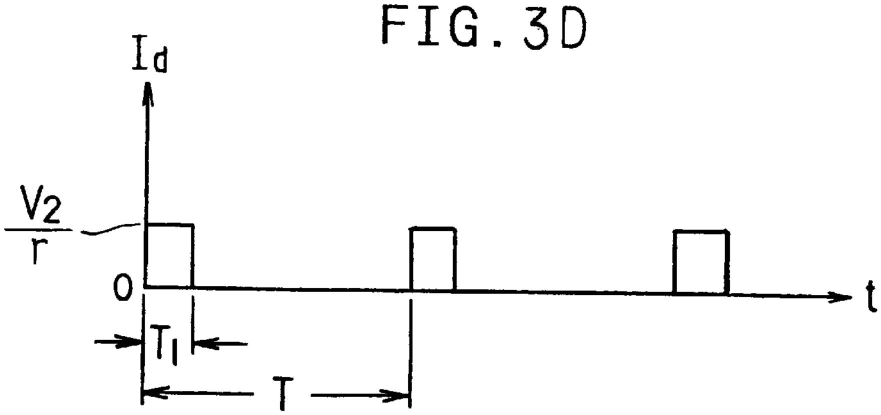
FIG. 3D is a time chart showing the driving current for the warning vibrator in the selective-calling radio receiver according to the embodiment of FIG. 1, where the dc supply voltage is low.

Since the control signal voltage $V_c$ contains the repeated square pulses as shown in FIGS. 2C and 3C, the warning vibration of the vibrator 10 is repeated intermittently according to the pulsed voltage $V_c$ .

Next, the compensation of the warning operation of the selective-calling radio receiver shown in FIG. 1 against the reduction of the supply voltage $V_p$ is explained below referring to FIGS. 2A to 2D and FIGS. 3A to 3D.

When the supply voltage $V_p$ is at a high level of $V_1$ which corresponds to the case where a set of new dry batteries are used as the dc power supply 4, the duration $T_h$ in which the level of the differential signal voltage $V_f$ is greater than the level $V_1$ of the supply voltage $V_p$ is short, as shown in FIG. 2B. The warning vibration of the vibrator 10 continues for the short duration $T_h$. The inter-terminal voltage $V_d$ of the vibrator 10 is approximately equal to $V_1$ and as a result, the electric power $P_d$ for driving the vibrator 10 is proportional to $(V_1^2\times T_h)$.

On the other hand, when the supply voltage $V_p$ is at a low level of $V_2$ lower than $V_1$, which corresponds to the case where the set of dry batteries have been used for a comparatively long time, the duration $T_1$ in which the level of the differential signal voltage $V_f$ is greater than the level $V_2$ of the supply voltage $V_p$ is longer than $T_h$, as shown in FIGS. 2B and 3B. The warning vibration of the vibrator 10 continues for the long duration $T_1$. The inter-terminal voltage $V_d$ of the vibrator 10 is approximately equal to $V_2$ and as a result, the electric power $P_d$ for driving the vibrator 10 is proportional to $(V_2^2\times T_1)$.

If the duration of the control signal voltage $V_c$ is defined as $T_d$, the electric power $P_d$ for driving the vibrator 10 can be approximately kept constant by adjusting the time constant (C•R) of the differential circuit 6 so as to satisfy the following relationship as $$V_p^2\times T_d \fallingdotseq V_1^2\times T_h \fallingdotseq V_2^2\times T_1.$$

Even if the inter-terminal voltage $V_d$ of the vibrator 10 varies, the warning vibration strength of the vibrator 10 can be restrained within a satisfactorily narrow range by approximately keeping the electric power $P_d$ constant. As a result, it is preferred that the time constant (C•R) is designed to satisfy the above relationship.

However, it is needless to say that the satisfaction of the relationship is not always necessary for the present invention. The reason is that the change or fluctuation of the vibration strength can be more reduced than that of the supply voltage $V_p$ due to the compensation of the driving duration $T_d$ of the vibrator 10.

The above parameters such as the time constant (C•R) are readily determined in the following way:

For the sake of simplification of description, the on-voltage of the switching transistor 9 is ignored and consequently, the driving voltage $V_d$ for the vibrator 10 is supposed to be equal to the supply voltage $V_p$ . Also, the peak value $V_h$ of the square-wave signal voltage $V_s$ and the differential signal voltage $V_f$ is supposed to be equal to the raised voltage $V_u$ of the dc—dc converter 3, where $V_u$2.2 V.

It will be apparent from the following explanation that the errors caused by the supposition can be readily corrected or revised by an ordinary or popular design method.

The electric power $P_d$ for driving the vibrator 10 is expressed by the following equation (1) as $$P_d=I_d\bullet V_p=(V_p/r)\bullet(T_d/T)\bullet V_p=(V_p^2\bullet T_d)/(r\bullet T) \quad (1)$$

From the equation (1), $V_p^2\bullet T_d=P_d\bullet r\bullet T$ is established. Therefore, the following equation (2) is obtained as $$V_p=(P_d\bullet r\bullet T/T_d)^{1/2}=(A/T_d)^{1/2} \quad (2)$$

where $A=P_d\bullet r\bullet T$.

It is difficult to realize a circuit satisfying completely the equation (2). Accordingly, a circuit approximately satisfying the equation (2) within the range (1.1 V to 1.5 V) of the supply voltage $V_p$ popularly used in the practical applications is tried to be realized.

Here, the peak voltage $V_h$ of the square-wave signal voltage $V_s$ and the differential signal voltage $V_f$ is set as 2.2 V. Then, the differential signal voltage Vf is expressed as the following equation (3) as $$Vf=2.2\ e^{-t/C\bullet R} \quad (3)$$

Using the relationship of $V_f=V_p$ and $t=T_d$ , the value of the time constant (C•R) is determined so that the equation (3) is approximated to the equation (2). Thus, the driving electric power $P_d$ for the vibrator 10 can be restrained from changing independent of the change of the supply voltage $V_p$ .

From the equation (3), the following equation (4) is obtained as $$C\bullet R=-T_d/[ln(\text{i } V_p/2.2)] \quad (4)$$

Subsequently, the value of the duration $T_d$ for driving the vibrator 10 corresponding to the value of the supply voltage $V_p$ within the range from 1.5 V to 1.1 V of $V_p$ is obtained by using the equation (2). The value of the duration $T_d$ thus obtained is then substituted into the equation (4), thereby obtaining the value of the time constant c which restrains the driving power $P_d$ from changing, as shown in Table 1.

TABLE 1

| $V_p$ [V] | $T_d$ ($P_d$ = Const.) | C · R ($P_d$ = Const.) | $T_d$ (CR = 1.15A) | $P_d$ (CR = 1.15A) |
|---|---|---|---|---|
| 1.5 | 0.44A | 1.15A | 0.440A | $P_{d0}$ |
| 1.4 | 0.51A | 1.13A | 0.520A | 1.03 × $P_{d0}$ |
| 1.3 | 0.59A | 1.12A | 0.605A | 1.03 × $P_{d0}$ |
| 1.2 | 0.69A | 1.14A | 0.697A | 1.01 × $P_{d0}$ |
| 1.1 | 0.87A | 1.20A | 0.797A | 0.97 × $P_{d0}$ |

(A= $P_d$ · r · T)

It is seen from Table 1 that the time constant C•R fluctuates within a range from 1.12A to 1.20A, in which the average value of the time constant is 1.15A. Therefore, the value of the time constant is set as 1.15A in order to make the fluctuation as low as possible.

Substituting the values of $V_p$ and C•R into the equation (4), the value of $T_d$ at the corresponding value of $V_p$ is obtained as shown in TABLE 1 using the following equation (5) as $$Td=-(C\bullet R)\bullet ln(V_p/2.2) \quad (5)$$

The internal resistance r of the vibrator 10 and the period T of the square-wave signal voltage $V_s$ are fixed. Therefore, substituting the values of $V_p$ and $T_d$ into the equation (1), the value of $P_d$ at the corresponding value of $V_p$ can be obtained as shown in the third column of Table 1.

Here, the value of $P_d$ is obtained and expressed as a reference of $P_{d0}$ defined as the value of $P_d$ at $V_p$=1.5 V, as shown in the fourth column of Table 1.

Figure 4:
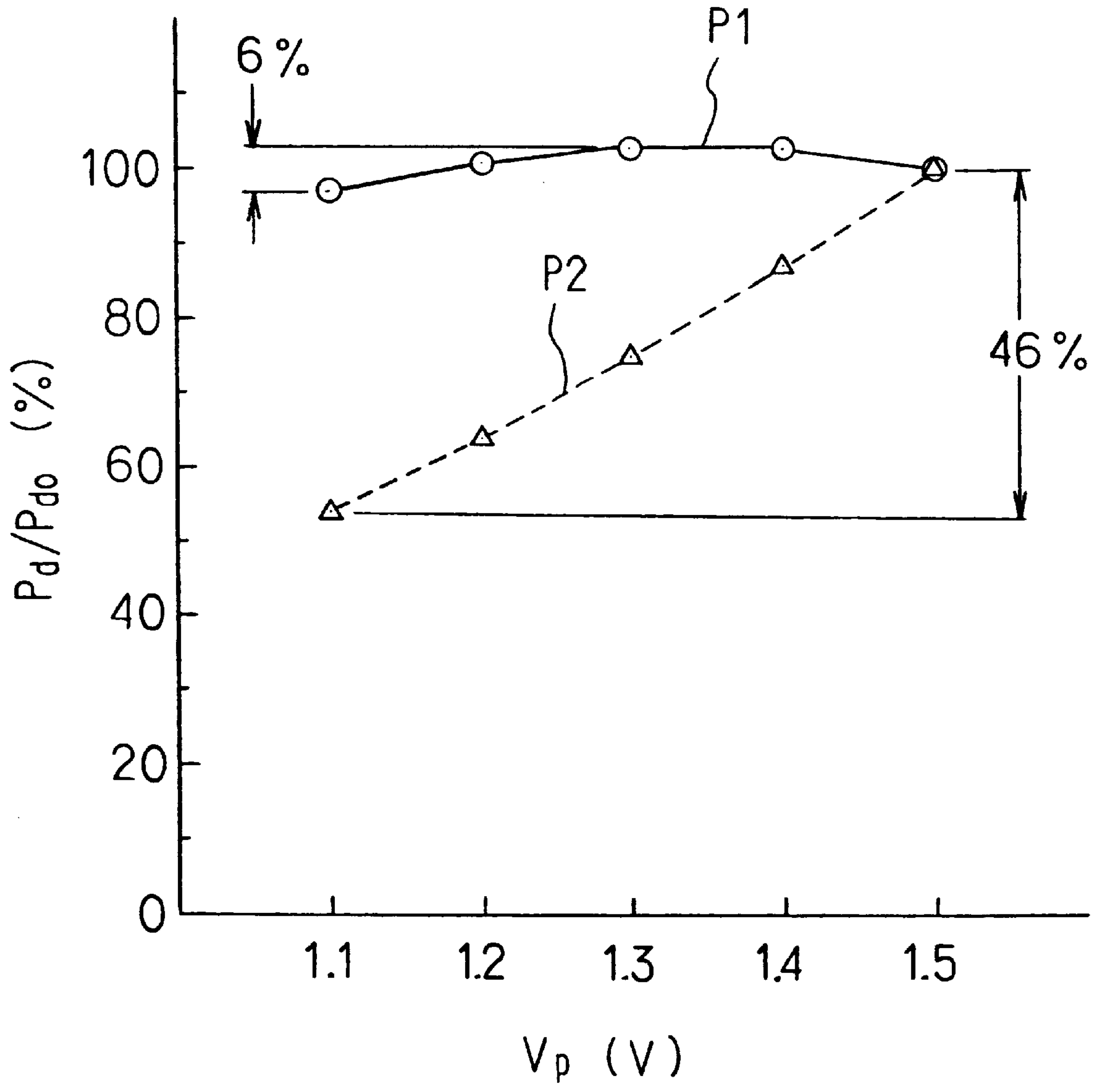
FIG. 4 is a graph showing the change of the dc electric power for driving the warning vibrator in the selective-calling radio receiver according to the embodiment of FIG. 1.

In FIG. 4, the plot P1 indicates the change of $P_d$ normalized by $P_{d0}$ as a function of $V_p$ in the selective-calling radio receiver according to the invention. The plot P2 indicates the change of $P_d$ normalized by $P_{d0}$ as a function of $V_p$ in the conventional selective-calling radio receiver.

It is seen from FIG. 4 that the maximum change of the driving power $P_d$ can be restrained to 6% of $P_{d0}$ in the embodiment of the invention even if the supply voltage $V_p$ of the dc power supply 4 decreases from 1.5 V to 1.1 V. On the other hand, with the conventional receiver, the maximum change of the driving power $P_d$ is 46% of $P_{d0}$ for the same reduction of $V_p$.

Thus, the vibration strength of the vibrator 10 can be restrained independent of the decrease of the supply voltage $V_p$.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A selective-calling radio receiver comprising;

a warning controller for controlling a warning operation, said warning operation including a warning vibration to alert a user upon receipt of a calling signal;

a vibrator for producing said warning vibration by an electric power, said electric power supplied from a single direct-current power supply;

a switching transistor for switching said electric power supplied to said vibrator to thereby produce said warning vibration of said vibrator intermittently;

said switching transistor having a first state in which said electric power is supplied to said vibrator and a second state in which said electric power is not supplied to said vibrator;

said first and second states being alternately effected by a control signal generated by said warning controller;

a power compensator for compensating a change in said electric power supplied to said vibrator to thereby limit change in a vibration strength of said warning vibration, wherein said power compensator adjusts said control signal so that a duration of time of said first state of said switching transistor is inversely proportional to said electric power supplied from said single direct-current power supply.

2. A selective-calling radio receiver as claimed in claim 1, wherein said power compensator comprises:

a square-wave signal generator for generating a square-wave voltage signal having a substantially square waveform;

a differentiating circuit for differentiating said squarewave voltage signal to thereby generate a differential voltage signal; and a comparator for comparing levels of said differential voltage signal and said supply voltage of said single direct-current power supply to thereby adjust said control signal so that said duration of said first state of said switching transistor is increased in response to a decrease in said electric power supplied to said vibrator.

* * * * *